April 27, 1965  C. CHATFIELD ETAL  3,180,316

TIMER OPENED PET FEEDING DEVICE

Filed Nov. 20, 1962

INVENTORS
CECIL CHATFIELD
RICHARD CHATFIELD
BY
Irwin C. Alter
ATTORNEY

United States Patent Office 3,180,316
Patented Apr. 27, 1965

3,180,316
TIMER OPENED PET FEEDING DEVICE
Cecil Chatfield and Richard Chatfield, both of
3524 N. 15th St., Milwaukee, Wis.
Filed Nov. 20, 1962, Ser. No. 239,019
1 Claim. (Cl. 119—51.12)

Our invention relates to pet feeding devices, and more particularly to a device that is time controlled.

The object of our invention is to provide a device that will retain pet food in edible condition until ready to be eaten by pets.

Another object of our invention is to provide a device of the character described, that may be set for service at a pre-determined time.

Still another object of the device is to accommodate one or more feeding compartments entirely separate from one another.

It is manifest to anyone familiar with feeding pets of varied types, that they are prone on eating the food as soon as it is set before them, and it is difficult to train them to eat their rations at the proper or accustomed time. It is also a known fact that at times it is necessary to leave the pet such as a dog, or the like, confined for a length of time, and it is the prime object of our invention to permit the owner of the pet to prepare the food and water in advance, and have it ready for serving at a pre-determined time for the benefit of the pet.

The device illustrated, described and claimed herein is a compact unit that may be employed as a regular permanent feeding dish, or may be set by a time control mechanism to be opened to provide access to the food at a predetermined time.

Figure 1:
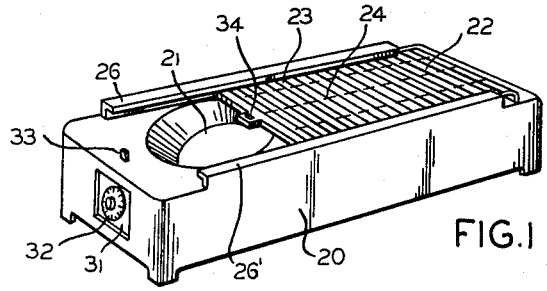
Figure 4:
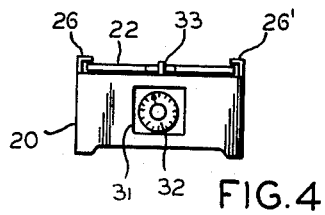
Figure 2:
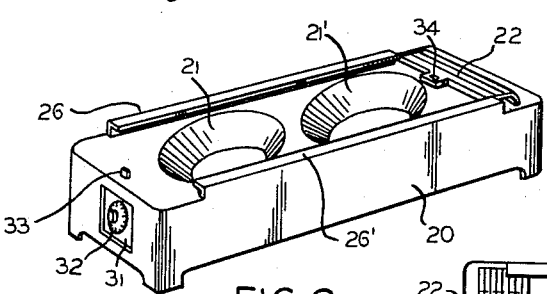
Figure 5:
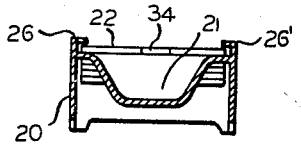
Figure 3:
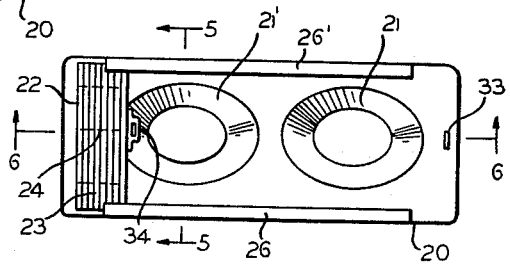
Figure 6:
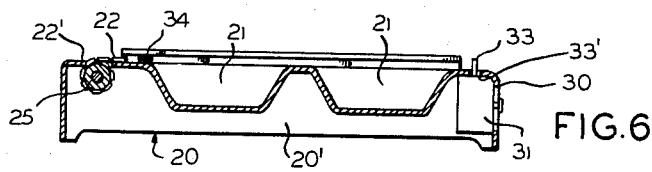
Figure 7:
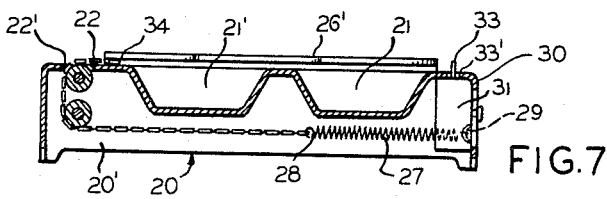
Figure 8:
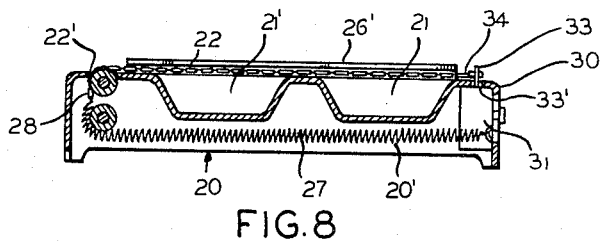

Other and further objects of the invention will become more apparent as the description proceeds when taken in conjunction with the drawings in which:

FIGURE 1 is a perspective view of the device constituting our invention, showing the cover partly opened, FIGURE 2 is a similar perspective view of the device with the cover entirely open to provide access to the dishes or food compartments, FIGURE 3 is a top view of the entire device, FIGURE 4 is an end view of the device, showing the timing device inserted into the end wall, FIGURE 5 is a lateral cross-sectional view of the device taken at the line 5—5 in FIGURE 3, FIGURE 6 is a longitudinal cross-section of the assembled device taken at the line 6—6 in FIGURE 3, showing the cover in an open position, actuated by means of a spring actuated roller onto which it is disposed, FIGURE 7 is a similar view as shown in FIGURE 6, but showing the cover in an open position, and actuated by a resilient expansion spring, and FIGURE 8 is a similar view of the device as shown in FIGURE 7, with the cover in a closed position.

Similar characters of reference indicate corresponding parts throughout the several views, and referring now to the same, the character 20 shows the body of the device, which may be molded in one piece out of plastic or the like as shown, or may be constructed of several sections attached to one another. The body 20 is shown integrally constructed with a pair of feeding dishes, or indentations, shown as 21 and 21', said body having a hollow portion 20'. Obviously one, or any number of these dishes 21 may be employed and made a part of the body 20, or may be separately inserted if desired. The body 20 with the dishes 21 and 21' inserted into its top, may be employed as a permanent feeding dish in the regular manner if desired, but the prime object of our invention is to equip the unit with a cover 22 shown as being constructed as a pliable unit, either of one piece of soft pliable material, or as a plurality of slats 23, held in alignment with a plurality of cords shown as 24.

The cover 22 is mounted on one of its ends onto a journalling means such as the roller 25 which is actuated by means of a conventional coil spring similar to a roller shade torsion spring. The cover 22 is guided at both its sides by a track formed by the channel members shown as 26 and 26' forming a part of the body 20, or mounted separately thereon. This construction is portrayed in FIGURES 1, 2, 3 and 6. However in FIGURES 7 and 8, we show the cover 22 having actuating means such as the expansion springs 27 attached at one end to the cover at 28 and at the other end at 29 at the furthermost wall 30 of the unit or body 20.

The one end wall 30 which is the furthermost wall from the slot 22' of the body 20 is equipped with a timing device shown as 31 which may be electrically actuated, or may be spring actuated in the conventional manner. The timing device 31 is also provided with a "clock face" 32 to permit its timing to be set at a predetermined position. This timing mechanism is of any conventional and efficient type, and is not considered a part of our invention, however it is equipped with a latch or lever shown as 33 extending upward from the face of the body 20 near one end, and the pliable cover 22 is equipped with a recessed adaptor shown as 34 on one end of the cover 22. When the cover 22 is in a closed position as shown in FIGURE 8, the pin 33 or latch of the timing device 31 protrudes through the opening 33' and engages the adaptor 34 on the end of the cover 22, to keep the cover in a "closed" position to prevent access to the contents of the dishes 21 and 21', and when the timing device is released the pin 33 will be retracted at a set time, and the cover 22 will be caused to move slidably within the channels 26 and 26' through the slot 22' and into the hollow portion 20' underneath the dishes 21 and 21' of the body 20 thereby exposing any food disposed within the dishes 21 and 21' in the top face of the body 20, and permitting the pet to consume the food disposed therein.

Obviously, the device may be retained in an open position for a conventional food trough, and may be set to open at a specific pre-determined time if desired.

The device is simple in construction, may be constructed to permit easy cleaning, and highly efficient for the purpose for which it is intended, and although we have shown a specific construction and arrangement of the parts, we are fully cognizant of the fact that many changes may be made in the shape, form, and configuration of the parts without affecting their operativeness, and we reserve the right to make such changes as we may deem convenient and necessary, without departing from the spirit of our invention or the scope of the appended claim.

I claim:

A pet feeding device comprising: a hollow body integrally molded of a thermoplastic material, a plurality of feed dishes being formed at the top of said body, a flat flexible cover having a recessed adaptor at one end thereof, channel means integrally molded on said body and forming a track to slidably receive said flexible cover whereby said cover obstructs access to said feeding dishes when it is received by said channel means, a timing device mounted on one end of said body and removably attached to said recessed adaptor, at one end of said flexible cover, said timing device having a clock exposed to the outside of said body for setting, said body having an opening disposed near said timing device, said timing device having a pin means protruding therethrough and being associated with said recessed adaptor, actuating means for said cover being attached to the other end of said cover and including a spring, said body having a slotted opening to receive said cover in its hollow portion when said cover is actuated from a position of obstruction with regard to said feed dish, journalling means attached to said body and being disposed proximately with respect to said slotted opening, said spring means being associated with said journalling means and being attached to the furthermost wall of said body in the hollow portion of said body whereby at a predetermined time said timing device retracts said pin and said cover is actuated into said slot around said journalling means and positioned under said feeding dishes so as not to obstruct access to said feeding dishes.

References Cited by the Examiner

UNITED STATES PATENTS

| | | | |
|---|---|---|---|
| 1,022,309 | 4/12 | Elliott | 119—51.12 |
| 1,274,845 | 8/18 | Bird | 119—51.15 |
| 2,111,319 | 3/38 | Euth | 312—297 |
| 2,157,682 | 5/39 | Sweeny | 119—51.15 |
| 2,752,995 | 7/56 | Dodge | 119—51.12 |
| 2,805,910 | 9/57 | Townsend | 312—297 |
| 2,845,896 | 8/58 | Copeland | 119—61 |
| 3,089,461 | 5/63 | Dunn | 119—63 |

SAMUEL KOREN, *Primary Examiner.*

ALDRICH F. MEDBERY, *Examiner.*